United States Patent [19]

Conzelmann et al.

[11] 3,854,105

[45] Dec. 10, 1974

[54] ASTABLE MULTIVIBRATOR AND AMPLIFIER CIRCUIT WITH FREQUENCY CONTROL

[75] Inventors: Gerhard Conzelmann, Leinfelden; Adolf Kugelmann, Leonberg, both of Germany

[73] Assignee: Robert Bosch, GmbH, Gerlingen-Schillerhohe, Germany

[22] Filed: June 18, 1973

[21] Appl. No.: 370,978

[30] Foreign Application Priority Data

July 24, 1972 Germany ........................... 2236209

[52] U.S. Cl. ............................ 331/111, 331/113 R

[51] Int. Cl. .......................................... H03k 3/282

[58] Field of Search ........... 331/111, 113, 143, 110, 331/144, 145; 307/290, 291; 328/193–207

[56] References Cited

UNITED STATES PATENTS 3,152,306 10/1964 Cooper et al. ...................... 331/113

3,566,307 2/1971 Morris ................................ 331/111

FOREIGN PATENTS OR APPLICATIONS 985,201 3/1965 Great Britain ...................... 331/113

*Primary Examiner*—John Kominski

*Attorney, Agent, or Firm*—Flynn & Frishauf

[57] ABSTRACT

To control the frequency of an astable multivibrator connected across diagonal junctions of a bridge circuit which has a capacitor in one branch, the voltage reference potential of the junctions is changed by means of semiconductor switches, typically transistors, connected to respective junction points so that the threshold level of response of the astable circuit, connected to the junction points, is changed, thus changing the frequency. The frequency can be lowered or raised by timed energization of the transistor switches connected to the respective junctions.

13 Claims, 9 Drawing Figures

ASTABLE MULTIVIBRATOR AND AMPLIFIER CIRCUIT WITH FREQUENCY CONTROL

The present invention relates to an astable multivibrator and amplifier circuit and more particularly to such a circuit which includes a monostable multivibrator connected across the diagonal junctions of a bridge circuit. In order to change the frequency of oscillations of such an astable circuit, the reference potential or threshold level of the astable circuit is changed by changing the voltage relationships at the junctions to which the astable circuit is connected. This voltage relationship is changed, typically, by including a controlled switching element such as a transistor in the circuit with the bridge circuit.

Monostable or astable multivibrator circuits frequently require operation at more lower one frequency, so that they can be used universally. For example, blinkers, direction signals and the like in motor vehicles may use astable multivibrators. These astable multivibrators should have more than one frequency of operation so that, when one of the flasher lamps becomes defective, the frequency of blinking of the remaining lamps should change so that the operator of the motor vehicle is informed that one of the lamps has become defective. Typically, the control or indicator light on the dashboard of the motor vehicle should then have a higher frequency of operation, together with the still remaining blinkers.

It is an object of the present invention to modify a known astable multivibrator circuit by simple and readily available circuit components so that the frequency of operation of the circuit can be changed by simple modification. The circuit, additionally, should use components which are reliable and inexpensive.

SUBJECT MATTER OF THE PRESENT INVENTION

Briefly, the frequency of the astable circuit is changed by changing the reference voltage at a diagonal of a bridge circuit which includes a capacitor, and to which the astable circuit is connected. This change is obtained, preferably, by connecting a transistor into the bridge circuit which is rendered conductive in synchronism with the then operating frequency of the circuit.

The invention will be described by way of example with reference to the accompanying drawings, wherein.

Figure 5:
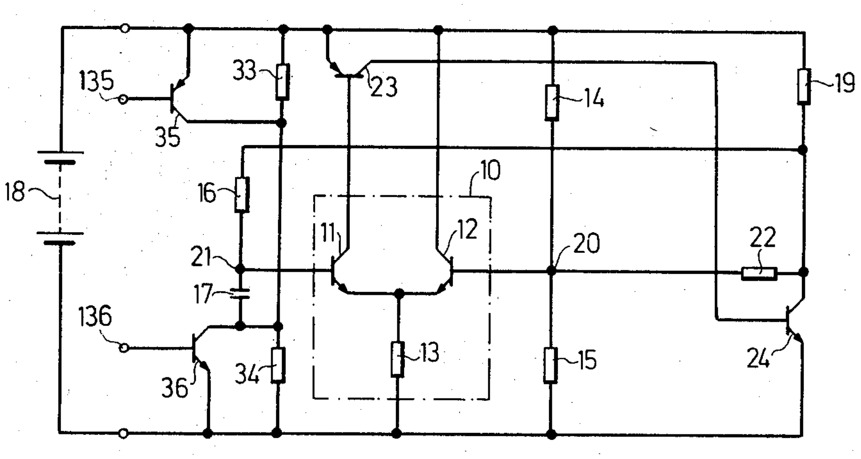
Figures 6A, 6B:
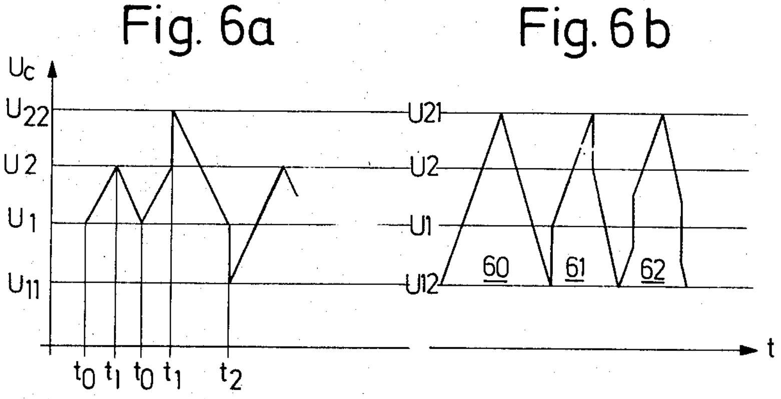

FIGS. 3*a* and 3*b* and 4*a* and 4*b* are diagrams of the output voltage *u* (ordinate) with respect to time (abscissa);

FIG. 5 is a schematic circuit diagram of a further embodiment of the invention;

and FIGS. 6*a* and 6*b* are diagrams to explain the operation of the circuit of FIG. 5.

Figure 1:
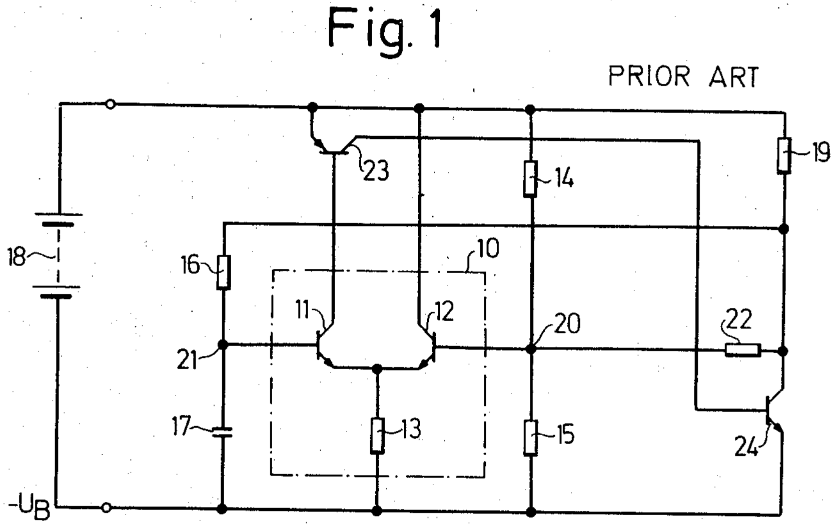
Fig. 1 PRIOR ART
FIG. 1 illustrates a circuit in accordance with the prior art, which is to be modified in accordance with the present invention.

The circuit of FIG. 1 is an astable multivibrator which includes a well known differential amplifier 10, having two transistors 11, 12 connected to have a common emitter resistor 13. The two inputs of the differential amplifier 10, that is, the bases of the two transistors 11, 12 are connected to the diagonal junction points 21, 20 of a bridge circuit. One branch of the bridge circuit is formed of resistors 14, 15, with common junction 20; the other branch is formed of resistor 16 and capacitor 17, with common junction 21. The two resistors 14, 15 are connected across a source of supply, battery 18, having a voltage $U_B$. Resistor 14 is connected to the positive terminal of battery 18, resistor 15 to the negative terminal thereof. Capacitor 17 is connected to the negative terminal of the battery, and resistor 16 is connected over load resistor 19 with the positive terminal of the battery 18. A resistor 22 is connected to the first diagonal junction 20 which connects to the load resistor 19 of a switching transistor 24. The output of the difference amplifier, in this case the collector of the first transistor 11, is coupled to the base of a coupling transistor 23, the emitter of which is connected to the positive terminal of battery 18 and the collector of which is connected to the base of the switching transistor 24. The collector of switching transistor 24 is connected to the junction of resistors 22 and 19, its emitter is connected to the negative terminal $-U_B$.

Operation: Let it be assumed that capacitor 17 is discharged, so that first transistor 11 of the difference amplifier 10, and with it the coupling transistor 23, and coupling transistor 24 (connected thereto) are blocked. Collector voltage of the switching transistor 24 is therefore practically at the positive operating voltage $+U_b$, if the resistors 16, 22 are large with respect to the load resistance 19. This is usually the case. Resistor 22, which is then in parallel with resistor 14 of the bridge circuit then provides current to charge capacitor 17 which will charge over resistor 16 and load resistance 19 of the switching transistor 24 to approximately positive operating voltage $U_B$. During this charging, the voltage at the second junction 21 will reach the voltage of the first junction 20. At this point, transistor 11 of the difference amplifier 10 becomes non-conductive and will block. Coupling transistor 23 and switching transistor 24 will have current flowing therethrough so that the collector voltage of the switching transistor 24 will change from the positive operating voltage $U_B$ towards the negative operating voltage $-U_B$. The voltage at the first junction 20, applied over resistor 22 will thus drop, and the second transistor 12 will rapidly block. The first transistor 11 of the difference amplifier 10 will carry all the current. Coupling transistor 23 now causes the switching transistor 24 to be completely conductive, so that the voltage at its collector, except for the minor saturation voltage, will drop to emitter voltage, that is, effectively to the negative operating voltage $-U_B$. Current will flow over switching transistor 24, and under this condition resistor 22 is in parallel with resistor 15 of the bridge circuit, and thus the voltage at the first junction point 20 of the bridge diagonal will be less than before. Since the resistor 16 of the bridge circuit is now effectively also at the negative operating voltage, $-U_B$, capacitor 17 discharges. The voltage at the second junction point 21 of the bridge diagonal will eventually reach the value of the voltage of the first junction 20. Current through the first transistor 11 of the difference amplifier 10 will decrease, and the circuit will flip back to its initial state, and the above described cycle will repeat.

It is apparent that the voltage at the second junction point 21 of the bridge diagonal, that is, at capacitor 17, will oscillate between two threshold values, which also arise at the first junction 20 of the diagonal. The upper threshold value is determined by the parallel circuit of resistor 22 and resistor 14; the lower threshold value is determined by the parallel circuit of resistor 22 and resistor 15. The frequency of oscillation, that is, the duration of the time period of the resulting oscillation is determined by the time constant which is defined by the circuit formed of capacitor 17 and resistor 16. Additionally, the period is defined by the value of the two threshold potentials arising at the junction point 20 (and reflected to junction point 21) of the bridge circuit.

In accordance with the present invention, the frequency of change, that is, the frequency of oscillation can be changed by changing the threshold potentials at the first junction point 20, or at the second junction point 21 of the bridge circuit or both, without changing the time constant formed of capacitor 17 and resistor 16. Change of the threshold potential occurs in synchronism with oscillation of the multivibrator circuit.

Figure 2:
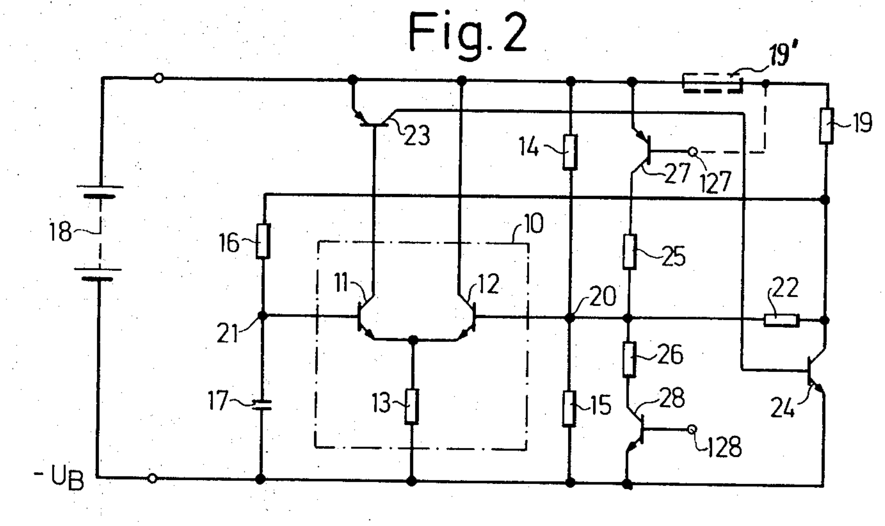
FIG. 2 illustrates the circuit of FIG. 1, as improved in accordance with the present invention, in order to change the operating frequency thereof.

Referring to FIG. 2, which is similar to FIG. 1 (and like parts, having like reference numerals will not be described again) it is seen that the voltage at the first junction point 20 of the bridge diagonal is subject to change. The difference amplifier 10, as before, has the two transistors 11, 12 and the common emitter resistor 14.

The first junction point 20 of the bridge diagonal, in accordance with a feature of the invention, is connected to two resistors 25, 26. Resistor 25 is connected to the collector of a control transistor 27, the emitter of which is connected to the positive terminal of the operating supply 18. Resistor 26 is connected to the collector of the second control transistor 28, the emitter of which is connected to the negative terminal of the operating supply 18. The bases of the switching transistors 27, 28 are connected to a control circuit formed by a resistor 19', connected to terminals 127, 128, respectively. The bases of the transistors 27, 28 have signals applied thereto which are synchronized with the astable multivibrator, and respectively switch the control transistors 27, 28. Transistor 27 can thereby be connected in parallel to the resistance 14 and/or the resistance 22. Likewise, control transistor 28 can place resistor 26 in parallel to resistor 15 and/or resistor 22. The upper and lower threshold potential of the first junction point 20 of the bridge diagonal can thus be raised or lowered, wherein "raised" means a shift of the voltage of the first junction 20 towards positive operating potential $U_B$, and "lowered" means a shift of the voltage of the junction 20 towards the negative terminal of the supply $U_B$.

Figures 3A, 3B:
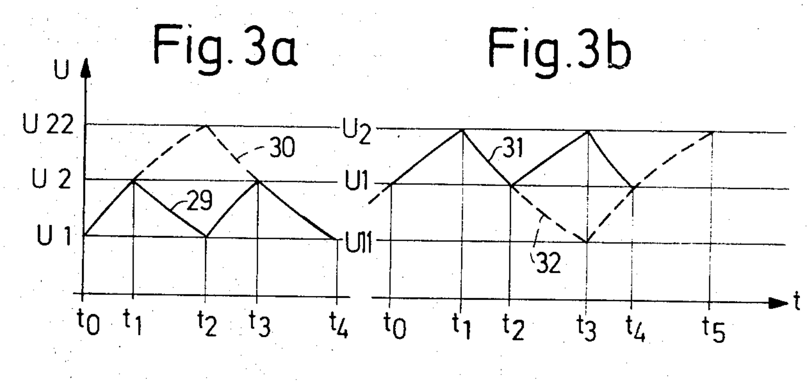

Operation, with reference to FIGS. 3*a*, and 3*b* and 4*a*, 4*b*: FIGS. 3*a* and 3*b* illustrate the voltage at the second junction point 21 of the bridge diagonal under different operating conditions. As discussed, the voltage at the first junction 20 of the bridge diagonal oscillates between an upper and lower threshold voltage. Line $U_1$ illustrates the lower threshold voltage, that is, the voltage in which the resistor 22 is connected in parallel to the resistor 15. The upper threshold voltage is shown at $U_2$, in which the resistor 12 is connected in parallel with the resistor 14. The oscillations which will form between the two threshold voltages will occur at the base frequency, that is, at a predetermined frequency with a predetermined repetition period. FIG. 3a illustrates the change which occurs when the upper threshold voltage $U_2$ is raised to a threshold level $U_{22}$. This result can be obtained by switching ON the first control transistor 27, or switching OFF the second control transistor 28. The threshold voltage $U_2$ must be raised to the value $U_{22}$ at a period of time $t$ which falls between $t_0$ and $t_1$ ($t_0 \leq t < t_1$). It must be dropped in a time which falls between $t_2$ and $t_3$ from $U_{22}$ to $U_2$ ($t_2 \leq t < t_3$). As above discussed, capacitor 17 will now change charge state between the raised voltage $U_{22}$ and the lower voltage $U_1$, so that an extended oscillation will result, as indicated by line 30 on FIG. 3a, prolonged over the oscillatory period illustrated by line 29, which is illustrative of the base frequency.

FIG. 3*b* shows the voltage relationship at junction point 21 of the bridge diagonal, if the astable circuit is controlled by changing the lower threshold voltage at the first junction point 20. As can be seen, the frequency is lowered, that is, the time period of switching is extended. The lower threshold voltage is again shown at $U_1$, the upper normal threshold voltage at $U_2$. The lower threshold voltage is obtained by parallel connection of resistor 22 with the bridge resistor 15; the upper threshold voltage by parallel connection of the resistor 22 to the bridge resistor 14. The base oscillation of the circuit is indicated in FIG. 3*b* at 31, the changed frequency by the dashed curve 32. The repetition frequency is obtained by lowering the lower threshold voltage $U_1$ at the first junction of the diagonal to a value $U_{11}$, which is obtained by controlling the second transistor 28 into conductive state and/or blocking the first transistor 27. The change-over of the lower threshold potential from $U_1$ to $U_{11}$ must occur in a period of time $t$, which falls between $t_1$ and $t_2$; the change-over of the lowered threshold voltage $U_{11}$ to $U_1$ must occur between $t_3$ and $t_4$. FIG. 3 thus illustrates the relationship which will obtain when a base frequency is to be lowered.

Figures 4A, 4B:
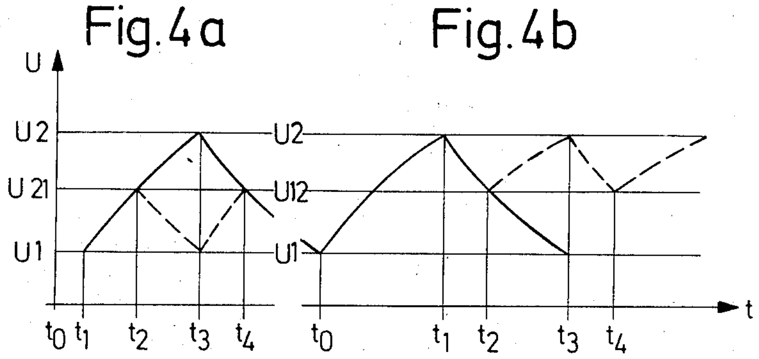

If the base frequency is to be raised, sot that the period is extended, then the switching relationships indicated in connection with FIGS. 4*a* and 4*b* must be followed. FIGS. 4*a* and 4*b* illustrate the voltage at the second junction point 21 of the bridge diagonal. A higher frequency of the output signal of the astable multivibrator is obtained if the upper threshold value at the first junction 20 of the bridge is lowered. The upper threshold potential is again illustrated at $U_2$, the lower threshold potential at $U_1$, and the decreased value at $U_{21}$. The frequency can also be lowered by changing the lower threshold voltage at the first junction point 20 of the bridge diagonal so that it will be higher, that is, by raising the threshold value at junction 20. Referring to FIG. 4*b*, the lower threshold level is indicated at $U_1$, the upper level at $U_2$ and the raised lower value at $U_{12}$. The upper threshold value $U_2$ is changed towards $U_{22}$ (FIG. 4*a*) in a time between $t_0$ and $t_1$ ($t_0 \leq t < t_1$). Raising of the lower threshold potential of $U_1$ to $U_{12}$ must occur in a period between $t_1$ and $t_2$ ($t_1 \leq t < t_2$).

As can be seen from FIGS. 3*a* 3*b* and 4*a*, 4*b*, changing the threshold level not only changes the period of oscillation but also the relationship of the turn-on to turn-off ratio. By symmetrically switching both threshold voltages, the symmetry of oscillation is maintained.

Embodiment of FIG. 5: In the circuit of FIG. 2, as explained in connection with the foregoing diagrams, the threshold level of junction 20 was changed, in order to affect the threshold level of junction 21. In the embodiment of FIG. 5, the threshold level at the second junction point 21 is directly changed. The basic circuit is the same, and will not be described again. The battery 18 is connected to a voltage divider formed of resistors 33, 34, the tap or junction point of which is connected to the electrode of the capacitor 17 which is not connected to junction 21, so that the reference voltage to which capacitor 17 is connected can be changed. Further, a pair of control transistors 35, 36 are connected in parallel to the respective resistors 33, 34 of the voltage divider, the emitter of transistor 35 being connected to the positive terminal of source 18, and the emitter of transistor 36 being connected to the negative terminal of battery 18. The bases of the control transistors 35, 36 are connected to a control circuit (not shown) over terminals 135, 136, respectively, which switch over the control transistors 35, 36 in synchronism with the frequency of the multivibrator circuit 10.

Operation, with reference to FIGS. 6*a* and 6*b:* The voltage at junction 21 of the bridge diagonal is changed by controlling transistors 35, 36, singly or together, to short-circuit resistors 33, 34, or to leave them in the circuit. For example, if transistor 36 is controlled to be conductive, the electrode of the capacitor would charge to the voltage which corresponds to the voltage at the junction of the voltage divider formed by resistors 33, 34, that is, roughly the voltage at the negative terminal of battery 18, that is, $-U_B$. The voltage of the other electrode of the capacitor 17, that is, junction 21 of the bridge diagonal is likewise pulled towards $-U_B$, changing the frequency of oscillation of the astable multivibrator with respect to the condition when transistor 36 is blocked.

The base period of oscillation is illustrated in FIG. 6*a* in the graph from $t_0$ to $t_1$ and again $t_0$ and $t_1$; under normal operations conditions, the voltage at the second junction 21 of the bridge then varies between the values $U_1$ and $U_2$. If, for example, at period of time $t_1$ transistor 35 is rendered conductive, to short-circuit the resistor 33 of the voltage divider, the voltage at the junction point of the voltage divider will jump by a predetermined value. This changes the voltage at the second junction point 21 of the bridge diagonal to the voltage $U_{22}$. A much longer period of time is now necessary to effect discharge of the capacitor. When the voltage in capacitor 17 again reaches the value $U_1$, that is, at time $t_2$, then transistor 36 can be rendered conductive, thus short-circuiting resistor 34 of the voltage divider 33, 34, so that the tap point of the voltage divider is approximately at negative operating voltage. The voltage at the second junction point 21 of the bridge diagonal is therefore roughly that of the battery, $-U_B$, so that again a longer period of time will be necessary for recharging of the capacitor 17.

FIG. 6*b* illustrates how the base frequency can be increased, or the base frequency decreased by changing the voltage at the tap points of voltage divider 33, 34 in opposite direction, timed with respect to each other. Transistors 35, 36 change the voltage $U_2$ and $U_{21}$ to the voltages $U_1$ and $U_{12}$, respectively. Comparison of the curve sections 60, 61, 62 (FIG. 6*b*) shows that the change-over can occur at different instances of time. The relationship of the switch-on to the switch-off period remains symmetrical, however, due to symmetry of the voltage jumps at the second junction point 21 of the bridge diagonal.

More than two output frequencies may be obtained from the astable circuit of the present invention by providing a plurality of voltage dividers, or sub-dividing voltage dividers, each one controlled by its own switching transistor.

The control transistors 27, 28 and 35, 36, respectively, can be replaced by relays, or other switching elements. Of course, complementary transistors, with suitably changed voltage relationships, and polarities can be used.

Various changes and modifications may be made within the scope of the inventive concept, and the embodiment described in connection with FIG. 5 may also be applied to the embodiment of FIG. 2, that is, both can be used together, for multi-frequency control, by selective gating of any one or all of the transistors 27, 28, 35, 36, respectively.

Terminals 127, 128 and 135, 136 can be controlled directly over an isolating stage by taking the voltage drop across a control resistor 19′, (shown in FIG. 2 in dotted lines) and applying suitably gated voltages to the terminals 127, 128, 135, 136, respectively (or any one or a number of them). If control resistor 19′ is subject to fluctuation, for example upon malfunction of a part thereof (resistor 19′ may represent flasher lamps or the like) then the voltage across control resistor 19′ will change, thus causing insufficient, or no gating potential to be applied to the respective transistors and, as disclosed above, changing the frequency of oscillation.

We claim:

1. Astable multivibrator-amplifier circuit comprising a bridge circuit having a first branch including first and second resistors (14, 15) and a first diagonal junction (20) of the bridge between the resistors;

a second branch including a third resistor (16) and a capacitor (17) and a second diagonal junction (21) of the bridge between the third resistor and the capacitor;

a differential amplifier circuit (10, 11, 12, 13) connected between said first and second junctions (20, 21), the duty cycle of the change of state of said astable multivibrator circuit being determined by the threshold voltages appearing on at least one of said diagonal junctions upon change of charge on the capacitor (17), so that said multivibrator circuit will oscillate at a base frequency determined by (a) the resistance-capacitance values of said bridge and said differential amplifier circuit, and (b) the respective instantaneous upper and lower threshold voltages appearing at said diagonal junctions;

a switching element (24) and a resistor (22) connecting the output of the switching element and the bridge circuit;

and wherein the improvement comprises controlled, cyclically operated switching means (27, 28; 35, 36) connected to and controlled by said astable circuit and being connected to control the value of the threshold voltage appearing on at least one of said diagonal junctions (20, 21) to change said value at the respective diagonal junction in synchronism with the frequency of oscillation of the astable circuit, to thereby change the switching frequency of the astable circuit.

2. Circuit according to claim 1, wherein the switching means (27, 28; 35, 36) are operative during at least a portion of the period of conduction of the differential amplifier.

3. Circuit according to claim 1, wherein, to decrease the frequency of the circuit with respect to its base frequency, the switching means (27, 28) controls the threshold voltage of the first junction (20) to be increased during a first partial time period of conduction of the differential amplifier, and then controls said threshold voltage to have a lower threshold level during its second partial period of conduction of the differential amplifier circuit than the respective threshold voltages, if said switching means were disconnected.

4. Circuit according to claim 1, wherein, to increase the frequency of the circuit with respect to its base frequency, the switching means (27, 28) controls the threshold voltage of the first junction (20) to be decreased during a first partial time period of conduction of the differential amplifier circuit and then controls said threshold voltage to have a higher threshold level during a second partial period of conduction of the differential amplifier circuit than said junctions would have with said switching means disconnected.

5. Circuit according to claim 1, wherein a reference voltage source (18) is provided connected to said bridge circuit and wherein the switching means (35, 36), to decrease the frequency of the circuit with respect to its base frequency, lowers the voltage at said second junction (21) with respect to the reference during a first partial time period of conduction of the differential amplifier circuit and then controls said threshold voltage at said second junction (21) to be raised with respect to said reference.

6. Circuit according to claim 1, wherein a reference voltage source (18) is provided, connected to said bridge circuit and wherein said switching means (35, 36), to increase the frequency of the circuit with respect to its base frequency, raises the voltage at said second junction (21) with respect to the reference during a first partial time period of conduction of said differential amplifier circuit and then controls said threshold voltage at said second junction to be lowered with respect to the reference.

7. Circuit according to claim 1, wherein the first branch comprises said first and second resistors (14, 15) connected in series, said second diagonal junction (20) being formed by the junction of said resistors;

and said second branch comprises said third resistor (16) and capacitor (17) connected in series, said second diagonal junction (21) being formed by the junction of said third resistor and capacitor;

a source of potential (18) is provided, a load resistor (19), one terminal of said source being connected through said load resistor to the third resistor (16) and to said first resistor (14) directly and the other terminal of said source being connected to said capacitor (17) and the second resistor (15).

8. Circuit according to claim 1, comprising a source of potential (18);

and wherein said switching means comprises a controllable switching element (27, 28) connected with a terminal of the source and the first junction (20).

9. Circuit according to claim 8, wherein said switching means comprises a pair of controllable switching elements (27, 28), each having one terminal connected to a respective terminal of the source and another terminal connected to said first junction (20).

10. Circuit according to claim 8, wherein the switching element comprises the collector-emitter path of a switching transistor (27, 28) and a resistor (25, 26) in series therewith.

11. Circuit according to claim 1, comprising a source of potential (18);

wherein the capacitor (17) has one terminal connected to said second junction (21) and the other terminal to said source (18);

and a voltage divider (33, 34) having controllable voltage division ratio connected to the other terminal of the capacitor, said switching means (35, 36) being connected to the voltage divider to change its division ratio.

12. Circuit according to claim 1, further comprising a coupling transistor (23) connected to the output of the astable circuit (10) and the switching element (24).

13. Circuit according to claim 1 further comprising a load resistor (19') connected to the output of the astable multivibrator circuit, said controlled cyclically operating switching means (27, 28; 35, 36) being connected to and controlled by a signal derived from said load resistor (19').

* * * * *